United States Patent [19]

Mouat et al.

[11] 3,945,125

[45] Mar. 23, 1976

[54] APPARATUS AND METHOD FOR CENTERING LOGS FOR VENEER PROCESSING

[75] Inventors: Thomas W. Mouat, Vancouver, Canada; Philip Howard LeMasurier, New Fairfield, Conn.

[73] Assignee: Weldwood of Canada Limited, Vancouver, Canada

[22] Filed: Apr. 27, 1970

[21] Appl. No.: 32,271

[52] U.S. Cl. ............................. 33/174 R; 33/174 P
[51] Int. Cl.² ..................... A61B 5/08; B23F 23/08
[58] Field of Search .......... 33/178 R, 178 E, 174 Q, 33/174 TA, 174 L; 51/49; 269/9, 10, 71, 107; 144/20.9 A

[56] References Cited
UNITED STATES PATENTS

| | | | |
|---|---|---|---|
| 2,523,563 | 9/1950 | Foreman | 144/209 A |
| 2,609,609 | 9/1952 | Moss | 33/174 R |
| 2,629,936 | 3/1953 | Cronstedt | 33/174 P |
| 2,749,673 | 6/1956 | Balsiger | 33/174 Q |
| 3,037,538 | 6/1952 | Graham | 144/209 A |
| 3,088,250 | 5/1963 | Hold | 51/49 |
| 3,263,374 | 8/1966 | Stuckey et al. | 51/49 |
| 3,270,423 | 9/1966 | Birrell et al. | 33/174 L |
| 3,321,869 | 5/1967 | Parrella | 51/49 |
| 3,333,370 | 8/1967 | Parella | 51/49 |
| 3,391,497 | 7/1968 | Parrella | 51/49 |
| 3,504,719 | 4/1970 | Don | 144/209 A |

*Primary Examiner*—Richard E. Aegerter
*Attorney, Agent, or Firm*—Anthony J. Casella

[57] ABSTRACT

Apparatus and method for centering logs and veneer blocks by determining the largest inscribed cylinder that the veneer block can contain. Sensors located along the log length measure the critical dimensions and feed their measurements into a computer circuit for determining in less than a minute, the proper end centers of the log under examination for the maximum dimension of the cylinder which can be obtained from the log in veneering operations. The sensing elements may also be optical or accoustical, and thus avoid direct contact with the log surface.

11 Claims, 14 Drawing Figures

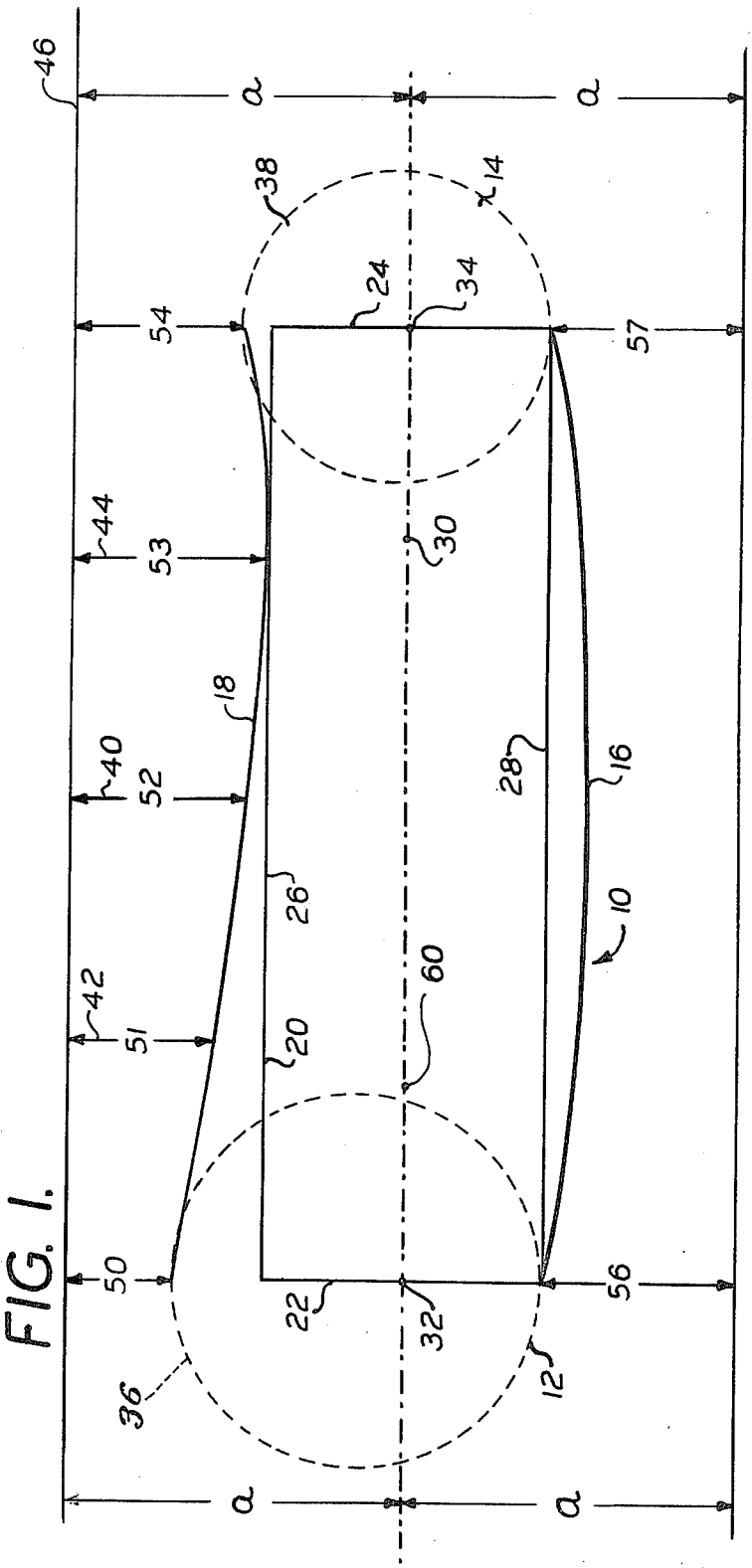
FIG. 1.
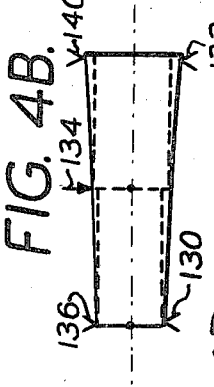
 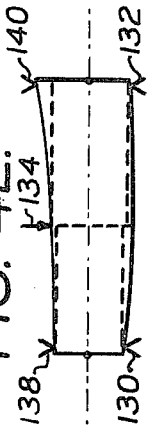
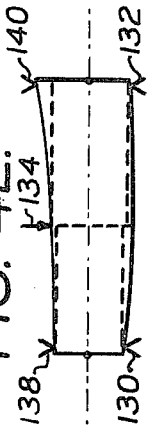 
INVENTORS
PHILIP H. LE MASURIER
THOMAS W. MOUAT
BY
James M. Heitman

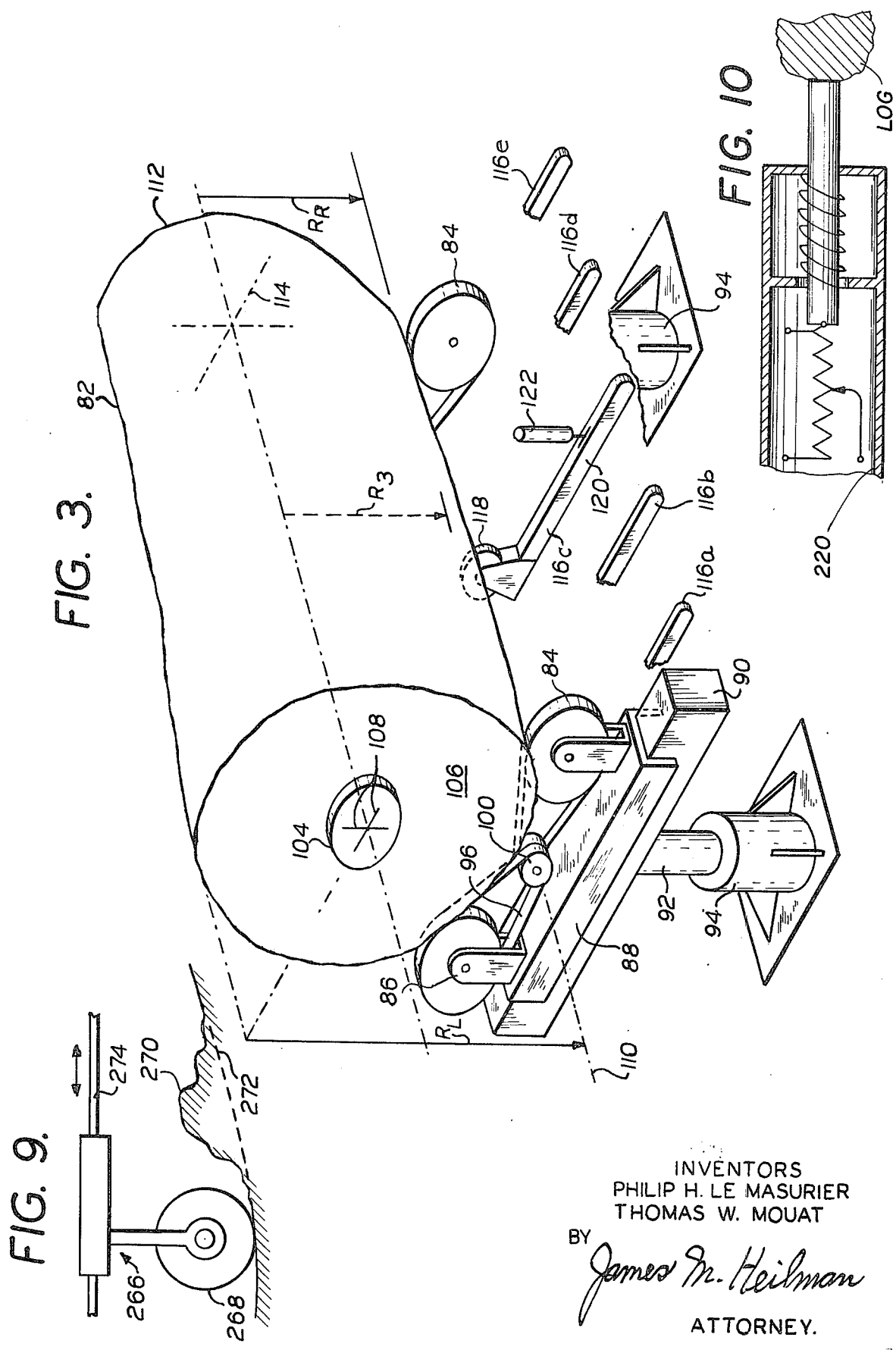

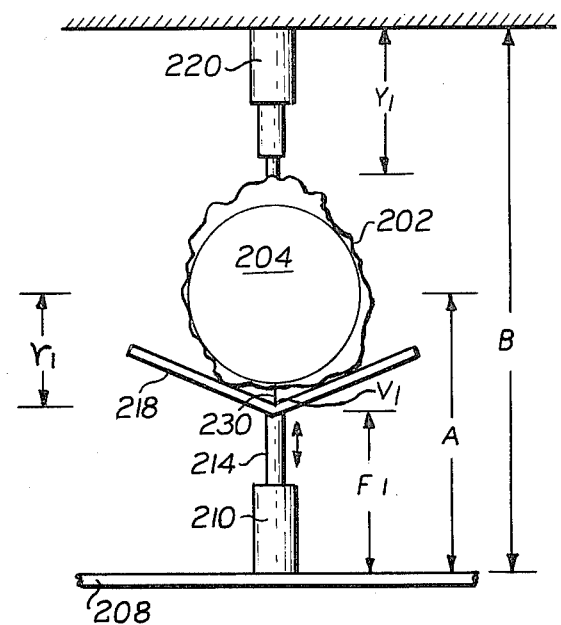
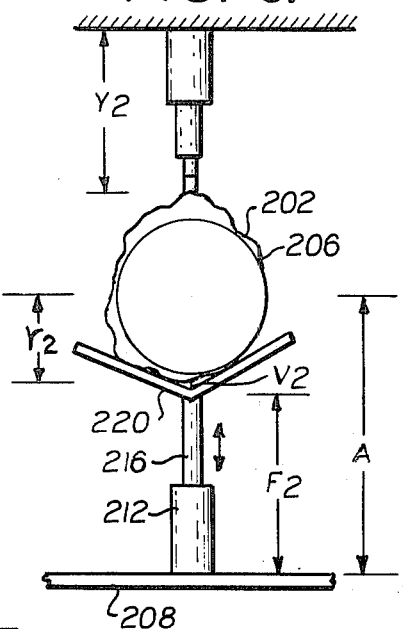
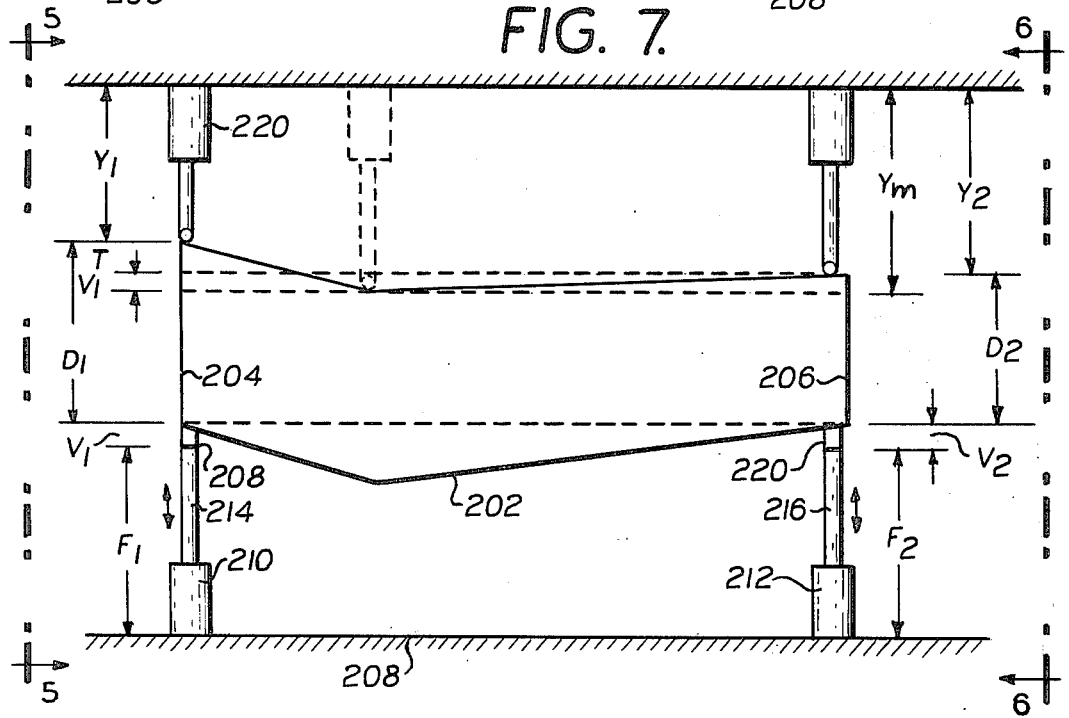
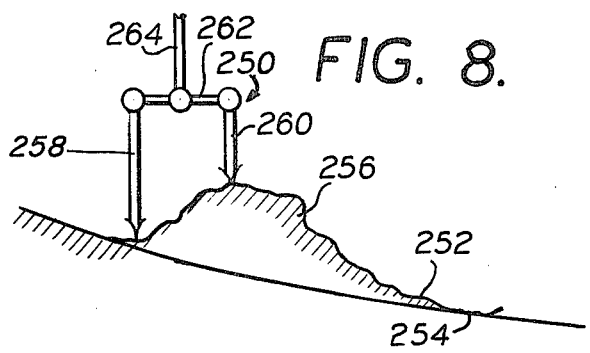

APPARATUS AND METHOD FOR CENTERING LOGS FOR VENEER PROCESSING

This invention relates to apparatus and methods of determining the proper centering of logs for veneer processing. The invention may be described as an apparatus and method for centering logs and veneer blocks by determining the largest inscribed cylinder that the veneer block can contain. Sensors located along the log length measure the critical dimensions and feed their measurements into a computer circuit for determining in less than a minute, the proper end centers of the log under examination for the maximum dimension of the cylinder which can be obtained from the log in veneering operations. The sensing elements may also be optical or accoustical, and thus avoid direct contact with the log surface.

An object of the invention is to provide a novel and improved apparatus and method for determining the proper centering of logs for finding the largest inscribed cylinder that can be contained therein, taking into account any irregularities in the log, for optimum recovery and minimum cutting time in veneering operations.

Another object of the invention is to provide a novel and improved machine and method for sensing the variations in a veneer block or log, along its length, so as to ascertain the diameter and eccentricity at predetermined stations along the length of the block, and to automatically therefrom determine the largest inscribed cylinder for that block or log, and the correct centering of the ends of the log for most efficient veneer production from the log.

A further object of the invention is to provide a novel and improved log centering method and device whereby the correct centering of the log for veneering operations is automatically determined in a very short time without the need for measuring or calculations by the operator. This is accomplished by placing the log in a centering machine which by a plurality of diametrial sensors at intervals therealong, and with the aid of a logic type computer into which the indications are fed, quickly determines the largest inscribed cylinder for that log, aand the correct accurate centering points on the ends of the log for most derivable veneer production therefrom.

Still another object of the invention is to provide a novel and improved log centering machine in which there is a pair of cradles for holding the log during centering, with stations therealong for measuring by sensors the radial distance from the datum axis to the block surface, and including logic circuits which combine the meausrement data from the sensors to define the largest cylinder which may be contained within the veneer block, the sensors, logic circuitry, and the traversing mechanism forming a closed loop system which insures that the desired accuracy of position of the block axis is finally obtained.

Still a further object of the invention is to provide a novel and improved log centering machine which can handle the centering of veneer blocks ranging from about 6 - 20 inches in diameter, or ranging from a diameter of about 10 - 60 inches, the determination of the correct centers for optimum veneer recovery being ascertained in a very short time, on the order of less than sixty seconds, to that each veneer block is then ready for shifting to a veneering lathe for best veneer production.

Another object of the invention is to provide a novel and improved log centering machine which may employ sensors for sensing the contour of the log surface therealong, either by direct contact engagement with said surface, or by accoustical or optical sensing of the surface without actual direct contact engagement.

A further object of the invention is to provide a novel and improved log centering machine and method which is operable without calculations by the operator, aside from the emplacement of the log in the machine. All the sensing observations are taken automatically and are fed into a computer circuitry whereby the best centering of the log is determined quickly.

Still another object of the invention is to provide a novel and improved log centering machine in which the initial cost and expense of the installation of the machine is easily and quickly recoverable by the extent of the savings in time, handling, and optimum veneer recovery with minimum wastage.

The above and other objects and advantages of the invention will become apparent from the following description of a preferred embodiment thereof as illustrated in the accompanying drawings, forming a part hereof, and in which:

FIG. 1 is a schematic elevation showing a veneer block and indicating the largest inscribed cylinder for veneer operations thereon.

FIG. 3 is a prespective view of a modified form of block supporting and centering device, with a block in position thereon.

FIG. 4 is a set of five side elevational views of veneer blocks of differing contours, which may be handled by the centering machine.

FIG. 5 is a left end elevational view of another modified form of centering device according to the invention, with a peeler block in position thereon, the view being taken from the left end of FIG. 7 on the line 5 — 5.

FIG. 6 is a view similar to FIG. 5, but taken from the right end of FIG. 7 on the line 6 — 6.

FIG. 7 is an elevational view of a modified form of centering device with a peeler block indicated in position thereon.

FIG. 8 is a schematic elevational view of a block with movable probe for feeling bumps and such irregularities.

FIG. 9 is an elevational view showing another form of movable probe on a block.

FIG. 10 is a fragmentary schematic cross section of a conventional feeler sensing device like element 220 of FIG. 5, including internal resistor and terminals.

Figure 2:
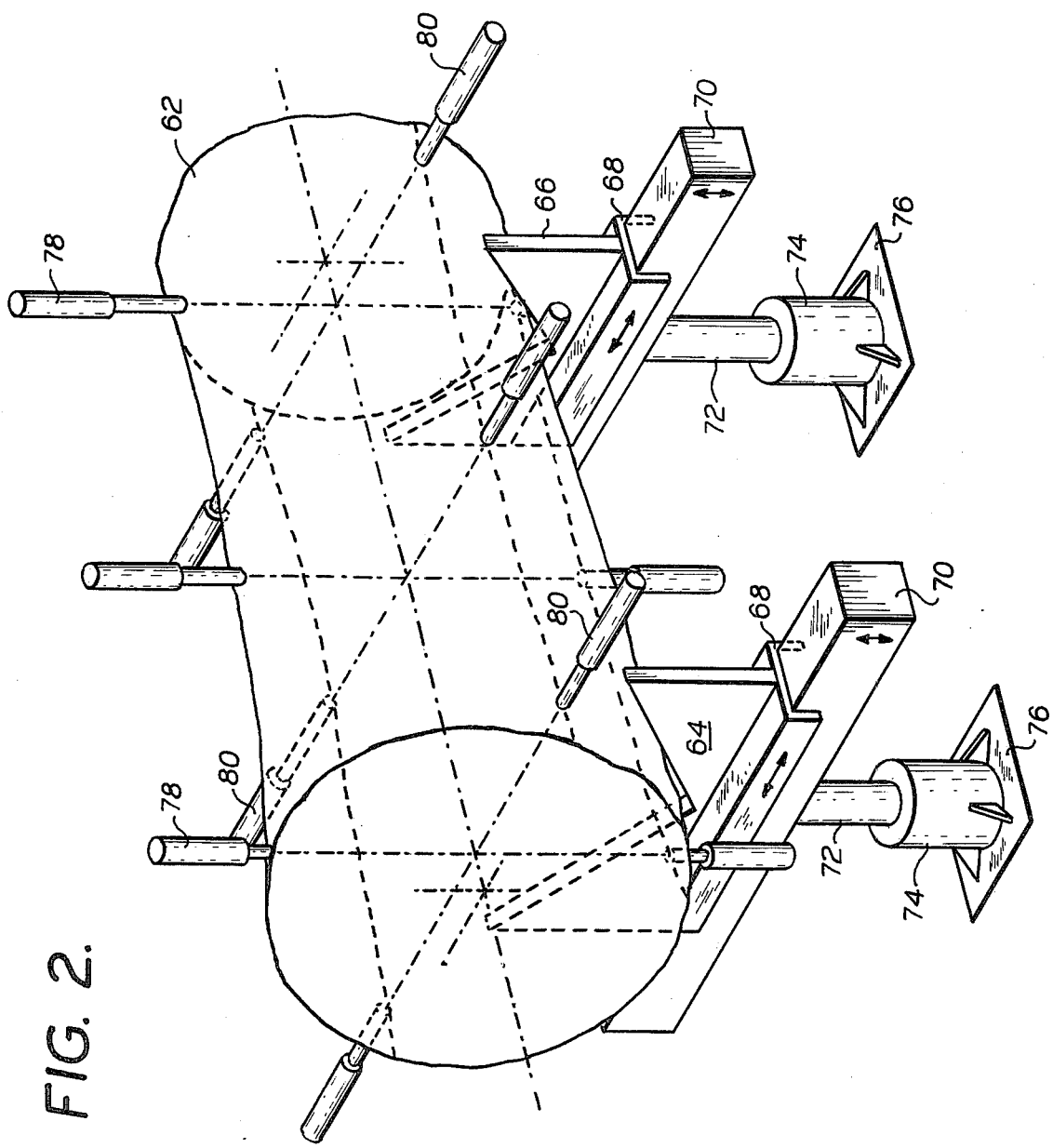
FIG. 2 is a perspective view of a block supporting and centering device, with veneer block in position thereon.

In connection with the processing of logs for veneer operation, various problems arise, which it is the purpose of the present invention to solve. Thus it is important to avoid wastage and to obtain an optimum recovery of veneer from the log. Each veneer block or log, when peeled in a veneer lathe, results in veneer the volume of which is essentially independent of peeling procedure.

The value of the veneer, however, depends greatly upon the procedure, ranging from less than nothing where the veneer is of such poor quality that is must be scrapped thereby involving an additional disposal cost, and upwards in value as an increasing part of the veneer becomes of higher grade quality. The centering of the block in the veneer lathe determines to a large degree both quantity of usable veneer that is produced, and its grade. Better centering results in cutting more of the veneer in a nearly continuous ribbon, minimizing clipping waste and jointing cost, and producing more sheets of top quality veneer.

The present invention provides a method and a machine to center logs or veneer blocks, which will work on the principles of finding the largest inscribed cylinder that a veneer block could contain, and to place the block in a lathe with the axis of that cylinder coincident with the veneer lathe axis. The invention further provides means for accomplishing the positioning of the log in the time compatible with the available process time limitations.

For this purpose, the method and machine also includes means for a comprehensive system for fully automatic operation, and which is commercially feasible. In general, as examples of the versatility of the apparatus, one variation may work on a time cycle of 20 – 30 seconds, and be capable of accepting veneer blocks in the diameter range of about 10 – 60 inches. Another variation of the invention may work on a time cycle of about 10 – 15 seconds, and be capable of handling veneer logs or blocks of about 6 – 20 inches diameter. The invention also includes necessary control circuits, sensing means, and logic systems and apparatus, applicable to either, for attaining fully automatic and accurate operation.

In veneering operations, it has been found that previous methods of centering can result in unnecessary loss in clipping of about one per cent or more of log volume and that a greater loss of value has resulted from production and processing of veneer components that would have been full sheets of the best quality veneer. The present invention provides centering methods and apparatus which are capable for better centering than has been heretofore attainable. Further, analysis shows that the increase in veneer volume recovery, computed in terms of purchased log costs, can repay the entire cost of the apparatus in a reasonably short period of time, being thus economically feasible.

In order to understand clearly the nature of the invention, and the best means for carrying it out, reference may be had to the drawings as follows.

As shown in FIG. 1, there is a veneer log or block 10, with ends 12 and 14, it being seen that the log 10 sags somewhat, so that its lower edge bends outwardly and its upper 18 edge bends inwardly. The view shows only these edges in profile for simplicity of illustration. In order to obtain optimum veneer recovery from the block 10, according to the present invention, it is desired to find the proper centering of the log 10 to obtain the largest diameter of cylinder containable within the contours of the log, and this is shown as the cylinder 20.

This contained cylinder has parallel end edges 22 and 24, and side edges 26 and 28 when viewed in profile as shown. The found axial center line 30 of the contained cylinder 20 extends axially through the left and right end faces 22 and 24 of the cylinder which coincide in position with the original end edges 12 and 14 of the log before veneering is performed thereon. Thus it is apparent that the centers of the ends of the original log are at locations 32 and 34 as seen in the view, and that it is to be mounted in the veneering lathe on these centers 32 and 34.

In order to ascertain the contour of the veneer log 10 and thus to find the maximum contained cylinder 20 and the centers 32 and 34 therefor, as shown in FIG. 1, a number of sensor elements are located lengthwise of the length of the log 10, one sensing location 36 being adjacent to the left end, a second sensing location 38 being adjacent to the right end, and three equally spaced sensing locations 42, 40, 44 located between the ends of the log. In this form of the invention there are five sensor locations.

Further referring to the analytic schematic diagram of FIG. 1, it is seen that there is an upper reference frame 46, and a lower reference frame 48 which are mutually parallel in the view. Upper sensors such as those shown at 50, 51, 52 53 and 54 extend downwardly from the upper reference frame 46 toward the log contour, nd lower sensors such as shown at 56, 57, and other locations if needed, extend upwardly from the lower reference frame 48 toward the log surface.

These sensors in effect scan the log surface and its contour in relation to the reference frames. The measurements by the sensors are converted in an analog device into coordinate differences between the locations of the ends of the rotational axis and the axis of the desired inscribed cylinder. Block supports are then traversed so as to bring the axis 30 of the inscribed cylinder into coincidence with the datum axis 60 of the centering machine. According to modified forms of invention, the sensors may also be constructed for optical or acoustic scanning of the log, in which event there is no direct contact with the log, and thus the life of the sensors may be expected to be much longer than that for contact sensors.

Looking at FIG. 2, it is seen that this is an isometric view of means for supporting a veneer log or veneer block as it is known in the trade, and for supporting the sensing and positioning operations. In this view there is the veneer block 62, shown resting upon two V-shaped cradles 64 and 66. Each of these cradles is provided with means for moving it vertically and laterally, (that is cross-wise to the length dimension of the veneer block). Each of the V-shaped cradles is mounted on a downwardly open channel member 68 movable slidably therewith lengthwise along beams 70. The beams 70 as in turn mounted on upright supports or posts 72 which extend upwardly out of main base members 74 seated on base footings or plates 76, thus providing a firm anchorage for the posts 72. While the cradles 64 and 66 are shown as V-shaped, they may also be curved in countour to conform to the contours of the logs, but are at any event constructed as to support the log above the centers of the posts. The construction is such that the ends of the logs can be individually elevated or lowered, and as an aid in centering.

In order to scan the contour of the veneer block, vertical sensors 78 and horizontal sensors 80 are located so that they can feel the block surface when called upon to do so. They may be pneumatically or mechanically advanced or retracted, When in contact with the block 62, they generate data which can be interpreted by the associated electrical circuitry and used to control the driving means for the vertical and lateral control of the position of each supporting V-shaped or otherwise shaped cradle 64 and 66. It is seen that the block can be repositioned under continuous control from the sensors until the block axis is brought to a position that will result in the greatest recovery of veneer from the subsequent peeling operation.

In FIG. 3, there is shown the peeler block 82, supported for rotation on spaced rollers 84 journaled in frames 86, the frames being in turn supported on slidable channels 88 for longitudinal movement therewith along the surface of the beams 90. The beams 90 are secured to the upper ends of the support posts 92 which are carried in turn by the stable bases 94. To rotate the peeler block 82, the rollers 84 are driven by belts 96 coupling them to a driven rotatable shaft 100.

In the form of FIG. 3, motive power is also provided for movement of the channels 88 along beams 90. Each cradle has thus means for rotating the block, and each has traversing mechanisms for vertical and lateral motion. The rotational mechanism permits surveying of the periphery of the block by a single set of sensors. The translational mechanism permits a selected axis through the block to be brought to the datum position, which may be called the replicate axis herein. From this position a transfer device will move the block to the peeler lathe and offer the block with its selected axis exactly coinciding with the rotational axis of the lathe.

Also as seen in FIG. 3, a rotational position and elevation indicator 104 is shown, with means for attaching it near to the geometric center of the block 106, and has a four positions switch as seen at 108, so it will indicate the quarter points of the periphery during rotation of the block. It also indicates the elevation of its center location above a datum level 110 on the centering machine. At the block end 112 opposite the combined rotation-elevation indicator 104, a simple elevation indicator 114 is attached. The indicators 104 and 114 retract when their work is finished and before the transfer device is permitted to grasp the block.

Looking further at FIG. 3, there are shown the block sensors mentioned above. Mounted beneath the block and arranged to feel the block surface through openings in the skirting around the cradles, are five sensor units 116a, 116b, 116c, 116d, and 116e, representing the ends, center and quarter points of the block length. Each sensor unit, such as 116c may have two probes, such as in the form of rollers 118 of about five or so inches in diameter, and spaced six to eight inches apart in the axial direction, according to one form of the device. These probes are mounted on pivoted arms 120 in such a manner that the roller such as 118 which approaches the block axis most nearly will operate a position transducer 122 and generate information for use in a cooperating analog device.

The analog device may take many forms, and may operate mechanically, electrically, electronically, or pneumatically. The analog device will accept data generated by the five sensors and by the rotation and elevation indicators, and from the data will generate traversing instructions for the movement of the V-shaped cradles to bring the block axis to the required location. In principle, the analog device, according to one form, produces replicas of each of two mutually perpendicular cross sections longitudinally of the block. Parallel rules fitted into these replicas will represent the outline of a cross section of the inscribed cylinder. A necessary constraint will ensure that the smaller indicator will dominate, and that the two cross sections of the inscribed cylinder will pass through a common axis, which, of course, becomes the block axis.

FIG. 4 indicates the major types of naturally occurring variations in the gross shaped of veneer blocks and indicates the critical points in which the sensors of the centering machine unit must locate and define in order that adequate information may be available to the computer to permit accurate centering under the action of the closed loop control system.

Considering blocks that have essentially circular cross-section, but that have various rates of taper, and various amounts of sweep (sweep is the word used in the industry to indicate curvature of the axis of the block), there are five catagories to be considered. These are shown in the five parts of FIG. 4. FIG. 4a is for blocks with a straight axis and a taper not exceeding about 1 inch in 8 feet, which may be called a slight taper. FIG. 4b is four blocks with a straight axis and taper exceeding about 1 inch in 8 feet, which may be called a large taper. FIG. 4c is for blocks with sweep (curved axis) and a taper not exceeding about 1 inch in 8 feet. FIG. 4d is for blocks with the sweep and a taper exceeding about 1 inch in 8 feet, but not exceeding two times the offset as a result of its sweep of the block axis from a straight line. FIG. 4e is for blocks with sweep, and a taper exceeding that of those in FIG. 4d.

In each of cases 4a, 4b, 4d, and 4e, the V's indicate the locations that must be sensed to permit gathering the data that is essential for accurate centering.

Where the cross sections of the blocks are not essentially cricular, a second cross section through each block more or less at right angles to those of FIG. 4 must be examined, classified as in FIGS. 4A, 4B, 4C, 4D, and 4E, and similarly sensed, so gathering data for adequate centering in the crosswise plane also.

In the elementary approach consider that each block may be supported at its ends upon V-shaped supports 130 and 132, and gauged from above and below by one or more sensors, as 134. In the cases of FIGS. 4A and 4C, which have little taper, the sensing needs are simple and a single upper sensor can be adequate. In the case of FIG. 4D a minimum of two upper sensors as 134 and 136 must be provided. For blocks in the categories represented by FIGS. 4B and 4E, at least three upper sensors as 134, 136, or 138, and 140, must be available. Should the blocks be optionally presented for centering with the larger diameter end to the right or to the left, a minimum of three upper sensors must be provided.

The showings of FIG. 4 a schematic and simplified whereas in actual practice, where irregularities exist in the log, and time of examination and centering is important, the number of sensors will be much increased.

In order to understand the essential principles of this invention, consider that each block will be presented to the centering device with the larger diameter end toward the right as illustrated in FIGS. 4A to 4E. Each block is then revolved so that the sweep if any is in the vertical plane with the belly downwards. Note that in a practical application the time needed to revolve a log is prohibitively long, so this step is avoided through the use of additional sensors and logic circuitry. Support the block at its ends. Center it in the horizontal plane geometrically, as may be easily accomplished by V-type supports if the block is circular in cross section. Now simultaneously and at the same rate raise the end supports and their sensors 130 and 132, and lower the upper sensors 134, 136 or 138, and 140, or any needed combination of them until contacts are made with the block.

The first upper sensor to contact the block will be 140 and it merely confirms that the larger end of the block has been found when it was expected to be.

As the advance continues other sensors will make contact in a sequence depending on the shape of the block. In the case diagrammed in FIG. 4A, contact of sensor 134 completes the sensing needed for centering. The ideal axis is parallel to a line joining sensors 130 and 132 and is midway between that line and sensor 134. If the traverse rates have been accurately maintained the ideal axis of the block will now be coincident with the replicate axis and the centering action is complete.

For each of the other typical blocks, diagrammed in FIGS. 4B, 4C, 4D and 4E, simple geometrical considerations will show the sensor combinations which must be balanced against the support sensors 130 and 132 to stop the advance motions of the supports when the block axis is correctly located. As diagrammed in FIGS. 4B and 4E for those blocks having a large taper, there is an appreciable economic gain from the veneer of half-block length, usable for cross-banding, that can be obtained from the larger end of the block. This bonus is an inherent feature of this invention.

For applications where a substantial proportion of swept blocks is encountered, sensor 134 should be enlarged by the addition of two feelers approximately twelve inches along the block axis on each side of the center point, as seen in FIG. 4B, and so arranged that the control is exercised by the last one of the three to make contact. Blocks having unsymmetrical sweep will then be gauged to within one-quarter inch of their lowest (ideal) gauging point.

The choice of complexity, or comprehensiveness, of the centering system must be based on a knowledge of the frequency of occurrences of peeler blocks in each of the five categories listed. By this means economic studies are made to determine whether the potential recovery in each group is worth seeking. Installation of a comprehensive centering system permits use of logs which cannot otherwise be prepared and peeled economically. The price differential for such logs makes their selection preferable.

The present invention discloses means and apparatus for making such processing of logs feasible and profitable, and with optimum speed in handling and determining the best centering of the log as explained herein.

Having now considered the simplified form of centering control, the use of logic circuitry will be introduced. Such circuitry brings with it several advantages along which are freedom from the need to orient the block before beginning sensing, immediate characterization of block profiles and adoption of adequate sensing combinations, closed loop control during traversing motions ensuring accuracy of positioning, centering or maximum veneer value recovery from each block, and minimum cutting time in the lathe, and ability to make and use redundant measurements so avoiding erroneous centering of blocks having surface irregularities such as blisters, knot bumps and the like. For applications where a substantial proportion of swept blocks is encountered, sensor 134 should be enlarged by the addition of two feelers approximately twelve inches along the block axis on each side of the center point, as seen in FIG. 4B, and so arranged that the control is exercised by the last one of the three to make contact. Blocks having unsymmetrical sweep will then be gauged to witin one-quarter inch of their lowest (ideal) gauging point.

MATHEMATICAL OR LOGIC FUNCTIONS

1. There are four groups of five sensors each, the groups being arranged at spacings of 90° apart about a circle, or as may be said, in two planes at 90° apart from each other.

Each group of five sensors explores a profile as concave, straight, or convex, using data of sensors 50, 52 and 54 as seen in FIG. 1, sensors 50 and 54 being at opposite ends of the block, and sensor 52 being midway between. Half the sum of the measurements from end sensors 50 and 54 is compared with the instrument sensor measurement 52 in the middle.

If the half-sum is greater, the profile is concave; if equal, the profile is straight; if less, the profile is convex.

2. The sum of measurements from a pair of opposing sensors is the "diameter". As this "diameter" does not pass exactly through the block center unless the block is of circular cross-section and is already centered, some error is introduced. However, the system makes measurements continuously and constantly revises the measurements as better is the achievement of centering. Ultimately, the error becomes negligible.

3. The measurements of "diameter" at end stations 50 and 54 are compared. The lesser diameter is the small end of the block. A knowledge of its location is vital in two of the three centering sequence alternatives. The logic circuitry provides separate outputs giving the magnitude of the small end diameter and the location of the small end station 50 or 54.

4. The circuits can recognize opposing profiles that occur in combination. The centering sequence is selected accordingly. These pairs of profiles are (a) concave-concave, (b) concave-straight, (c) concave-convex, (d) straight-straight. A proof circuit compares profile characterizations of the pairs and warns if a non-occurring combination is indicated. Should such an indication occur, the centering machine disqualifies itself. The block is then centered by the cradles only.

5. For profile pairs that are straight-straight, or concave-concave, the axis of the inscribed cylinder passes through the midpoints at the diameters of the small end of the block and the mid-section of the block. Two differential amplifiers compare the opposing sensor indications at the small end and midsection. The outputs control the traverse mechanism which moves the block to reduce the imbalance until a pre-set residual is attained, when centering is complete in that plane.

6. For profile pairs that are concave-straight, or concave-convex, the logic system forms a baseline, then finds the least offset from the baseline to the opposite profile and bases the subsequent centering on the magnitude and location of the least offset. The baseline joins the end-points of the straight side or of the convex side for profile pairs that are straight or convex in combination with concave.

Depending on the location of the least offset, whether it is found to be at the end, or not at the end of the block, the circuit chooses the appropriate logic sequence.

7. When the least offset is found at the end of the block, the axis of the greated inscribed cylinder passes through the midpoint of the diameter of the small end of the block, and through the midpoint, of a straight line joining the concave profile sensor at the mid section to the large end sensor of the convex or straight profile.

Two differential amplifiers compare the opposing sensor indications from the upper and lower sensors at the small end, and opposing sensor indications from the mid section sensor of the concave profile and the large end sensor of the straight or convex profile. The outputs from the two differential amplifiers control the traversing mechanism which moves the block so as to reduce the differences between the pairs of sensors until a pre-set residual is reached. Centering in that plane is then complete.

8. When the least offset is found to be not at the end of the block, the axis of the greatest inscribed cylinder is parallel to the baseline, and midway between the baseline and the point on the opposite profile which shows the least offset.

Two differential amplifiers compare the sensor indications of the baseline sensor at the small end with the comcave profile sensor showing the least offset, and the baseline sensor at the large end with the same concave profile sensor showing the least offset. The outputs of the two differential amplifiers control the traverse mechanism as described in 7. above.

FUNCTION UNITS

1. Classification of profiles.

For each group, end sensors 50 and 54 and middle sensor 52 are used to classify the group profile. Half the sum of end sensors 50 and 54 is compared with middle sensor 52 by substracting each from the other. When the half-sum is greater than the indication from middle sensor 52, the profile is concave. When the half-sum is less, the profile is convex. When it is equal, the profile is straight.

For Group A the circuit is:

2. Combination of Profiles.

The profiles from opposing groups are related. The relation forms the basis for selection of the centering system. The tree-growth characteristics limit the way that opposing profiles may be combined. A concave profile may be opposite another concave side, or opposite a straight or convex side. A straight side may be opposite a concave side or another straight side. A convex side may be opposite a concave side only.

The circuit for determining the profile combinations for Groups A and C is:

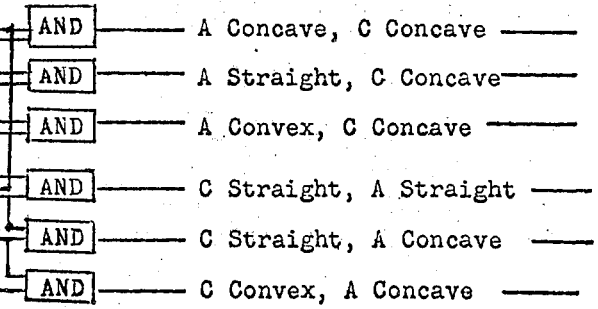

The circuit for determining the profile combinations for Groups B and D is similar.

3. Baseline Selection.

The profile combination dictates the choice of centering sequence that must be followed. Double concave and double straight profile combinations require centering from the small end and mid-section data. Convex-concave and straight-concave combinations require further examination before it is possible to decide if a simple or a stepped included cylinder will be preferable For convex-concave and straight-concave pairs centering requires the use of a hypothetical straight line joining the end points of the convex or straight side, and computation of offsets from this straight line to the sensors of the opposite profile. The process selection indicates for these combinations which profile will be replaced by the straight line (which will hereafter be called a "baseline").

The circuit for the A - C combination is:

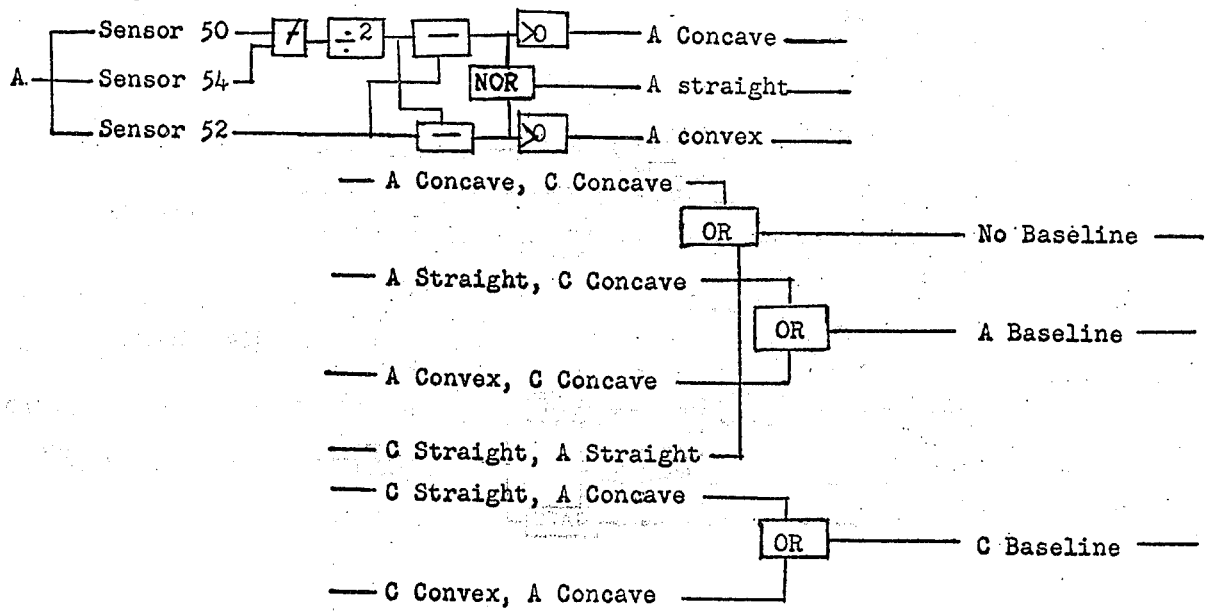

The circuit for the B - D combination is similar.

4. Baseline and Offsets Section

After the process selection produces the baseline controls, the baselines must be established and the offsets from the baselines must be computed. The circuit which does this for the A and C groups is:

5. Small End Location and Minimum Offset

From the output of the baseline section, information is taken which defines the smaller end of the block (as being located at sensor Station 1 or Station 5). The information also is combined to show that the minimum offset from the baseline is at the block end, or is not at the block end, and to give the size of the least offset.

The circuit for each group is:

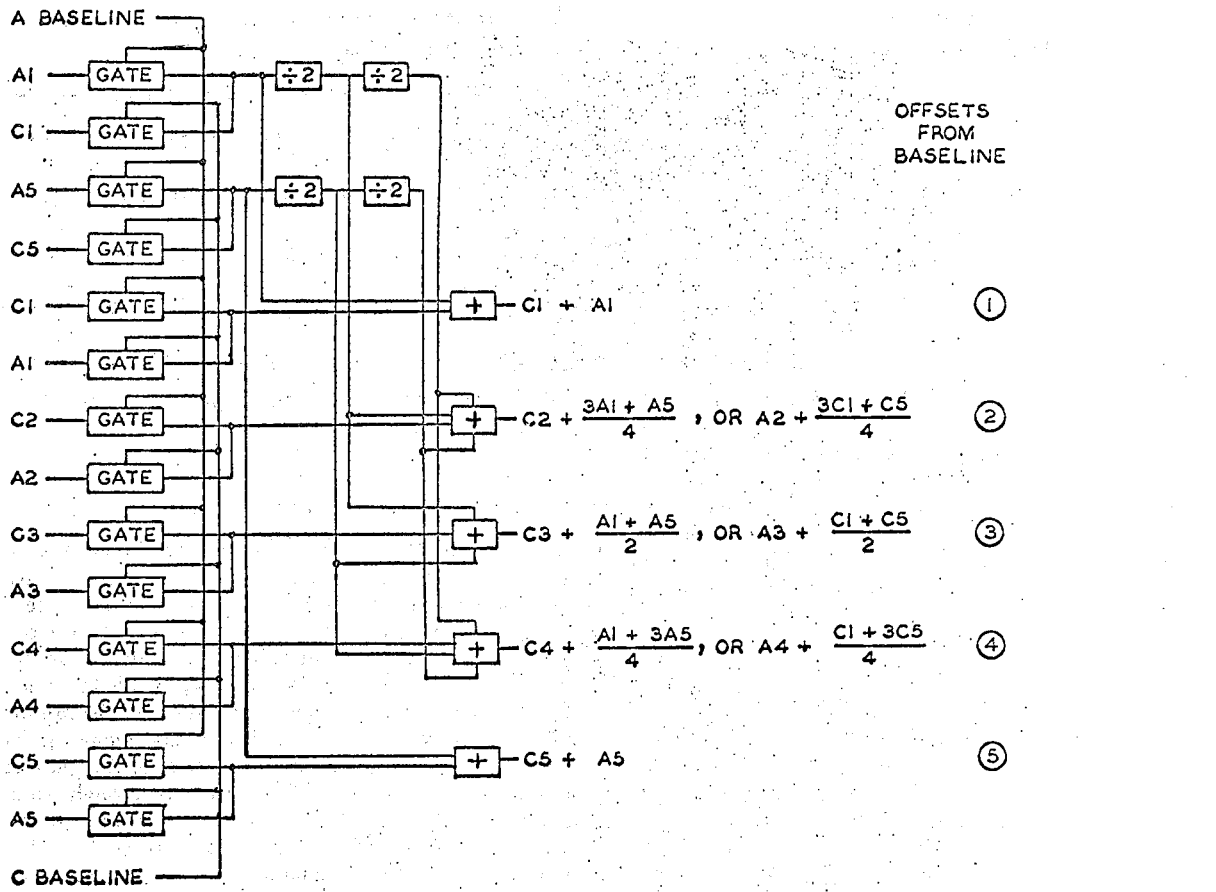

The circuit for the B and D groups is similar.

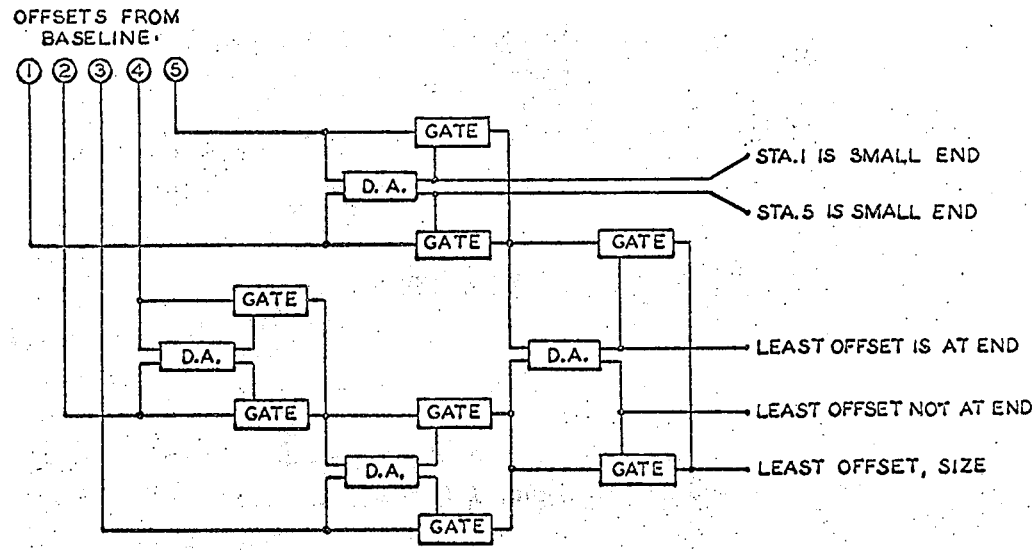

6. Traverse Controller, Double Straight, Double Concave Profiles

For blocks having pairs of opposing profiles that are classified as "double straight" or "double concave," the largest inscribed cylinder is defined by the small end of the block. If the taper is appreciable, a stepped cylinder may be defined by small-end and mid-section cross-sections. The controller accepts the data for location of the small end, and the dimension data for the small-end and mid-section diameters, which it combines and uses for control of the traverse unit until the block reaches the centered position when the opposing dimensions are equalized.

The circuit for the A - C cross-section is shown below:

These blocks are centered on an axis parallel to the baseline and at a distance from it equal to one-half the least offset of the opposite, concave profile from the baseline. The circuit accepts "Combination of Profiles" data which activates it. It accepts "Baseline" data which defines the baseline and selects the dimension data which is fed into the circuit. It accepts the dimension of the least offset from the "Minimum Offset" circuit. The data is combined and compared and used to control the traverse unit to move the block until an equality is found between the distances of the three critical points (two ends of the baseline plus one minimum offset) from the datum axis of the machine.

The circuit appears below for the A - C cross-section. A similar circuit is used for the B - D cross-section.

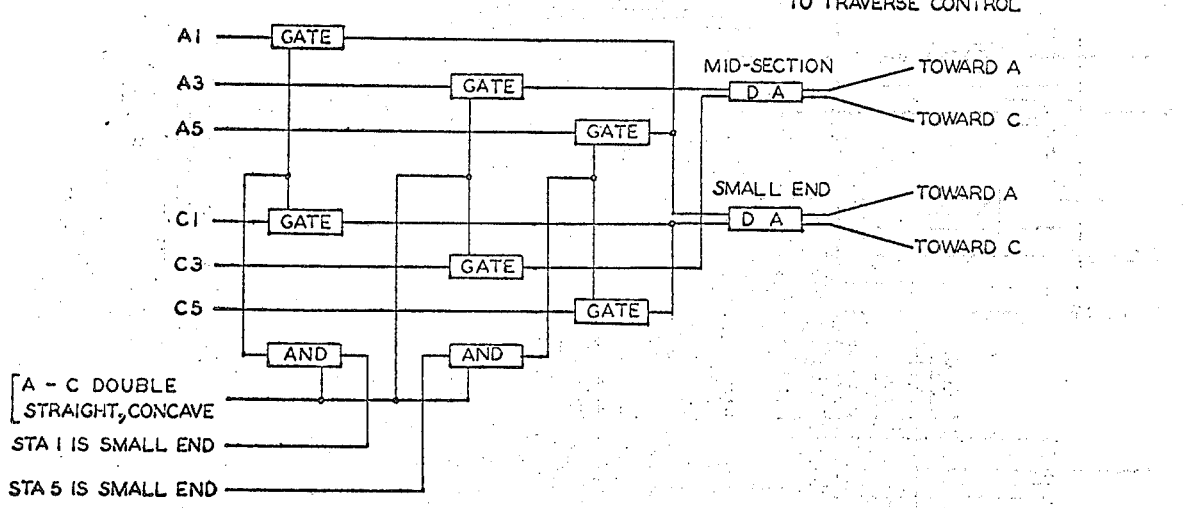

The circuit for the B - D cross-section is similar.

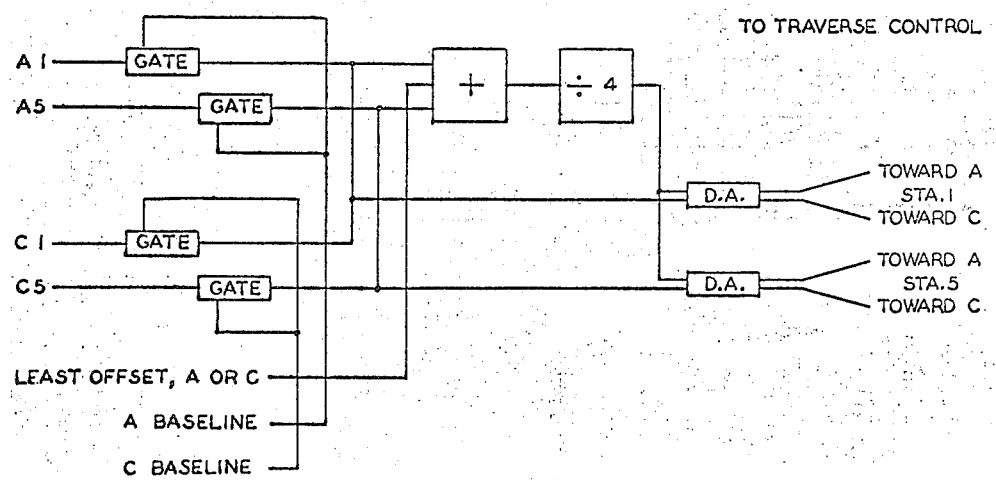

7. Traverse Controller, Convex-Concave and Straight-Concave Profile Pairs having the Least Offset Not at the Small End

8. Traverse Controller, Convex-Concave, and Straight-Concave Profile Pairs, having the Least Offset at the Small End Blocks in this category are centered on an axis through the mid-point of the small end, and through the mid-point of a line joining the "Baseline" end at the large end of the block to the mid-section profile point on the "Concave Profile." The circuit accepts "Small-End" location data and "Baseline" data, which controls acceptance of the necessary dimension data. The circuit is divided into two comparison units, one for the small-end data, the other for the large-end, mid-section data. The circuit controls the Traverse Unit which moves the block until its axis coincides with the datum axis and equality of dimension is reached for the two axis-location points.

The circuit for the A – C cross-section is given below. The circuit for the B – D cross-section is similar.

9. Traverse Unit

The control functions from the three centering sequence units are fed into group of eight multi-input OR modules. An input to any one circuit causes the corresponding control solenoid to move a valve which will pass hydraulic fluid to the propulsion cylinder and move the peeler block. Motions in the A – C and B – D planes, at Station 1 and Station 5, are separately controlled.

The circuit is shown below:

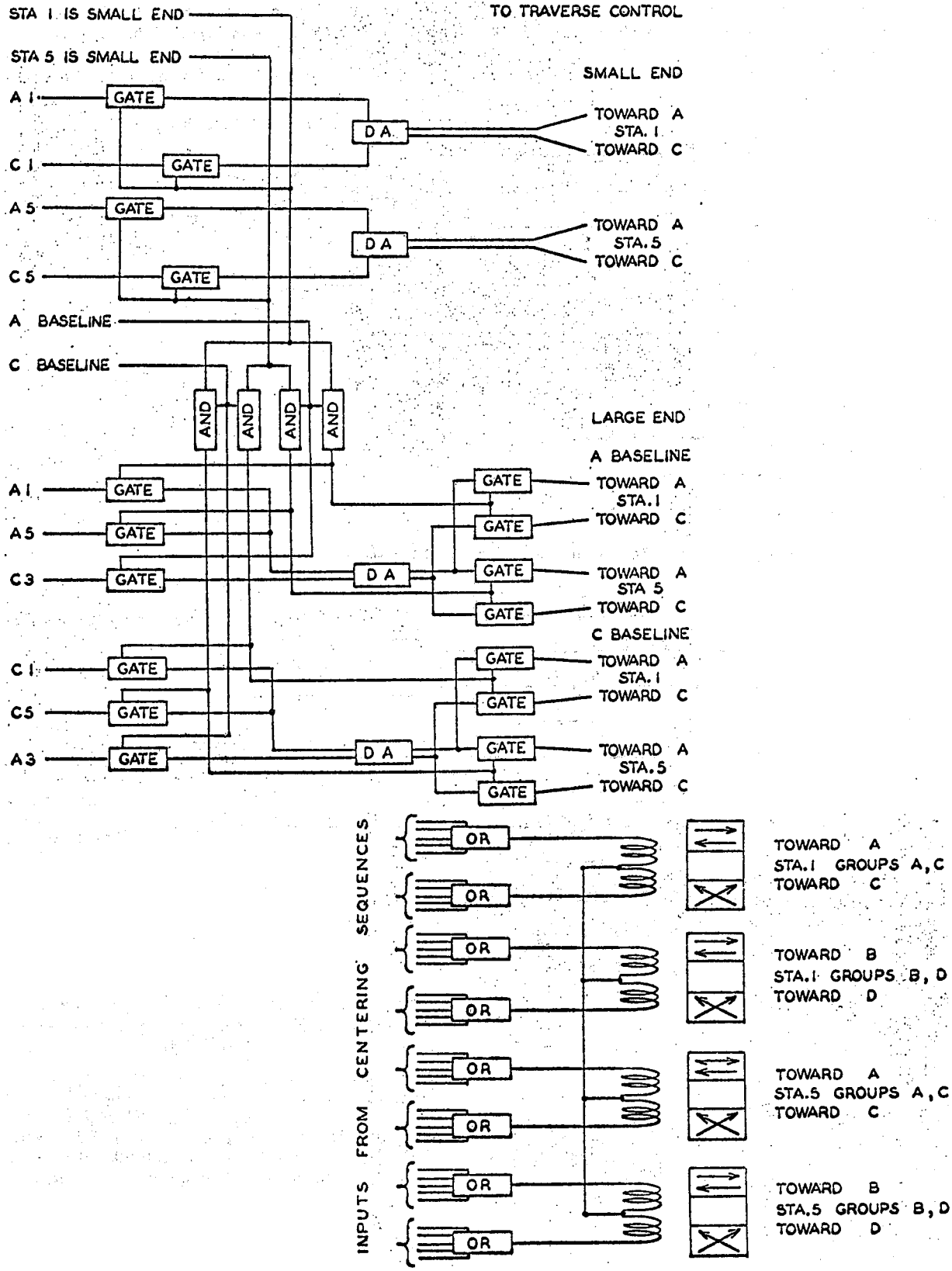

There are various methods and apparatus for accomplishing the objectives herein within the spirit and scope of the invention, and these have been alluded to and described in some detail herein, Further details are set forth herebelow for complete understanding of the nature of the invention and the best means for practicing the same.

Referring to FIGS. 5, 6 and 7, it is understood that use is made of the means for projected concentric circles on the opposite end of each log to determine the initial center for each end of the log. Such projectors may be of optical construction with projection lamps projecting concentric rings on each end surface of the log for obtaining a trial centralization. If the log has no apparent sweep (bow) then these centers are used for chucking the log. If the log does have apparent sweep, then the sweep bar, with its traveling telescoping sensor 220 is lowered and used in scanning the log surface by traversing the same. In this case, however, the final center of the maximum cylinder is determined in reference to the center of the projected concentric circle.

As seen in FIGS. 5, 6 and 7, there is the log 202, the larger end 204 of which is seen in end elevation in FIG. 5, and at the left in FIG. 7, in side view, while the smaller end 206 is seen in face view in FIG. 6 and in side elevation in FIG. 7. The rough bark surfaces of the log are as indicated generally in the end views of FIGS. 5 and 6, and these are likely to be more or less smooth than as shown. At each end of the base portion 208, there are log support members 210, 212 which are traversable in any needed directions to accept logs of various lengths, and these have vertically telescoping supporting extensions 214 and 216 for elevating or lowering individually the cross arm type vee-shaped support arms 218 and 220 at their respective ends of the logs.

It is understood that for clarity and simplicity of illustration, FIGS. 5, 6 and 7 are schematic and diagrammatic and omit details as not needed for explaining the principles of their construction.

The sequence of operations in this form of the device for log centering is as follows:

1. The log is placed in the pair of vees 218 and 220 which can move laterally and vertically independently of each other.
2. It is determined visually by an operator if there is any appreciable sweep. If there is no sweep, then follows step 3. If there is sweep, then follows steps 4 through 10.
3. Center the log using projected concentric circles, chuck it at these centers and sent it to the lathe.
4. The operator rolls the log in the vees until it is bowed downwards.
5. Center the log using the projected circles at each end.
6. A telescoping, tranversely movable distance measuring sensor such as at 220, which is attached to a sweep bar located directly over the centers of the projected circles and parallel to the floor 208 is lowered until it touches one end of the log.
7. After the sensor makes contact with the log it then travels along the log, always maintaining contact until it reaches the other end. The computer stores the initial distance from the sweep bar to the log (Y1 or Y2), the maximum distance of the sweep bar to the log (Ym) and the final distance between the sweep bar the log (Y1 or Y2).
8. At the same time that step 6 and step 7 are occurring, a telescoping sensor at the center of each sweeping vee, such as 230, at the center of each supporting vee 218 and 220, moves up until it makes contact with the log and measures V1 and V2.
9. The computer, using the information supplied by the sensors, and the already stored distances B F1 and F2, calculates the following data:
   a. $d = Ym - Y2$
   b. $t = Y1 - Y2$
   c. $r_1 = A - (V_1 + F_1)$, $r_2 = A = (V_2 + F_2)$
   d. $D1 = B - (V_1 + F_1 + Y_1)$, $D_2 = B - (V_2 + F_2 + Y2)$
   e. $D = D_1 - (t + d)$, $\bar{D} = D_2 - 2r_2$
10. The computer then compares the quantity of $D_1 - (t + d)$ to the quantity $2r_1$, and also $D_2 - 2r_2$ to $d$.
    a. If $[D - (t + d)] < 2r_1$, then the large end of the log is chucked $r_1 - D/2$ unites below the center of the projected circle.
    b. If $[D_1 - (t + d)] \geq 2r_1$, then the large end of the log is chucked at the center of the projected circles.
    c. If $[D_2 - 2r_2] \geq d$, then the log is chucked at the center of the projected circles.
    d. If $[D_2 - 2r_2] < d$, then the small end of the log is chucked $d - (D_2 - 2r_2)$ units below the center of the projected circles.

DEFINITION OF SYMBOLS

1. $F_1$ — distance from the bottom of the vee at the large end of the log to the floor after step 5.
2. $F_2$ — distance from the bottom of the vee at the small end of the log to the floor after step 5.
3. $D_1$ — distance from the bottom of the large end of the log to the bottom of the vee.
4. $D_2$ — distance from the bottom of the small end of the log to the bottom of the vee.
5. $Y_1$ — distance from the sensor bar to the top of the large end of the log.
6. $Y_2$ — distance from the sensor bar to the top of the small end of the log.
7. $Y_m$ — maximum distance from the sweep bar to the top of the log.
8. B — distance from the sweep bar to the floor-always fixed.
9. A — distance from the center projected circles to the floor-always fixed.
10. $r_1$ — radius measured from the bottom of the large end of the log at the center of the vee to the center of the projected circles.
11. $r_2$ — radius measured from the bottom of the small end of the log at the center of the vee to the center of the projected circles.
12. $D_1$ — diameter of the large end of the log measured by the sweep bar at the top and the sensor at the bottom of the vee.
13. $D_2$ — diameter at the small end of the log as measured by the sweep bar at the top and the sensor at the bottom of the vee.

It is to be noted that the distances $F_1$ and $F_2$ are measured by the vees, which are themselves distance measuring sensors.

Referring to FIGS. 8 and 9, it is here seen that means is provided for dealing with surface irregularities which might interfere with the probes, and thus lead to false information. As seen in FIG. 8, for example, there is a two headed probe 250 for traversing the surface 252 of the peeler block 254. For traversing a knot bump 256 in the surface of the block, a pair of probe elements 258 and 260 are mounted on a base 262 carried by a post 264 by any suitable means for movement along the block. Such a simple probe equipped with the two heads, spaced a few inches apart, each capable of indicating when contact by an advancing probe is made with the surface of the veneer block, the heads being easily rollable over the surface. If irregularities on the block surface are widely separated and smaller in size than the separation of the sensing heads, then contact by both heads at once is reasonably certain to indicate the true surface location. Contact by one head before the other will probably indicate that an irregularity has been found, but the location of the second sensor will always be nearer to the true surface. This action is indicated in FIG. 8.

FIG. 9 illustrates another traveling probe 266, with a wheel large enough at 268 to overrun irregularities or other known bumps 270 in the block 272. The track is shown at 274, and a pneumatic proximity sensor with automatic advance and retract feature, capable of scanning a highly irregular contour can be used. The location of the dotted profile can be approximated closely by projection of the regular profile from both sides of knot-bump. In the two headed probe of FIG. 8, the first head may automatically disconnect itself on contact so that the remaining head will advance further and provide a better indication of the true surface location. It is thus seen that the FIG. 9 device provides a redundant probe in a traversing device, which can provide redundance in measurement, and by inversion of mechanism can permit the block to move past the probe, so enabling the necessary block centering data to be obtained as the block moves along the conveying system. If a measuring probe of the single point variety happened to lodge on an irregularity such as a knot bump, faulty information might be generated. With a traversing probe of this type, the true outline could be electronically generated even though knot bumps resulted in erroneous data for part of the traverse.

The valid parts can be distinguished and extended to fill the gap represented by the bumps. The traversing probe system can thus be inverted so that the probe remains in one location and measures the log surface as the log passes along a special form of conveyor. It is possible that the traverse can be either of the log or of the probe, either being movable.

The following diagrams and schematic circuits are shown in the body of the specification to avoid undue encumbrance of the drawings, for indication of typical connections of elements and sensors in carrying out the work of determining the optimum centering of the cylinder which can be contained in the log for profitable veneering operations.

They make use of symbols and wiring well known in the art of circuitry and automation, to those skilled in the art.

Diagram 15 shows the connections for:
1. Manual Control of Block Rotators.
2. Manual Controls for Horizontal Traverse Control for Optical Centering.
3. Manual Controls for Vertical Traverse Controls for Optical Centering with Relay Interconnection for Automatic Control by Sensors and Differential Amplifiers and Relay Selectors.
4. Manual Control for Sensor Advance and Retract.
5. Push Button Initiation of Automatic Vertical Traversing Sequence.
6. Block Rotator.
7. Horizontal Traverse.
8. Vertical Traverse.
9. Control Selection.
10. Vertical Positioning.
11. Sensor Advance and Retraction.
12. Vertical Leveling, etc.
13. Vertical Scanning, etc.

The portions are identified in the diagram by the indicated numbering thereon.

Diagram 16 shows schematically the upper and lower sensors U and L, in sequence numerically, and the controls responding thereto in the overall sensing and centering operation. In this arrangement, there is at 16 the diagram overall, with at 17 the lower sensor station 1, the lower sensor at station 5 shown at 18, the lower sensor station 1 at 19, the upper sensor station 2 at 20, the upper sensor station 3 at 31, the upper sensor station 4 at 22, and the upper sensor station 5 at 23.

Also in Diagram 16 at 24 there is shown the vertical leveling sensors and relays (which raise the large end until under surfaces at 1 and 5 are at the same level and also detect and record the larger end). Diagram 16 also at 25 compares the upper surface elevation at stations 2, 3 and 5, detects least elevation sensor and connects it to the next comparator and maintains circuit until relay 4 or 5 is opened.

At 27 in Diagram 16, the circuit is shown which establishes equal offsets between minimum upper surface elevation and small end under-surface elevation.

At 26 in Diagram 16, the circuit is shown which compares minimum of stations 1, 3 and 5, with 2 or 4 and records station with least elevation. It maintains circuit until relay 4 or 5 is opened.

At 28 in Diagram 16, the circuit is shown which establishes equal offsets between minimum upper surface elevation and large end under surface elevation, except if minimum upper surface elevation is at small end of the log, when equal offsets are between mid-section (Sta. 3) upper surface elevation and large end under surface elevation.

Diagram 17 is a schematic circuit diagram of the circuitry of a preferred example of the invention construction, which provides the logic for the log centering of the device, the ultimate objective being to derive quickly and economically and accurately the optimum dimensions of the log which can be subjected to the veneer lathe operations with a minimum of waste.

This Diagram 17 is largely self-explanatory to those skilled in the art, and shows the electric and electronic means whereby the movement of the sensing devices which encounter the selected areas and surfaces of the peeler block or log, are to be reflected in the controls which physically mark and position the block itself, and make it possible in a short time, on the order of about a minute or less, to determine the best centering of the log for transfer to the lathe.

Below the Diagram 17, the various symbols are identified, which are employed in the circuit diagrams of the logic circuitry for log centering. It is believed that the representation shown is sufficient for those skilled in the art to understand clearly the nature and extent of the invention, in conjunction with the balance of the disclosure herein.

Although a preferred embodiment of the invention has been set forth herein in various details, it is understood that this is not by way of limitation but merely by way of example, and that various changes may be made in size, shape, materials and arrangement without departing from the spirit and scope of the invention as claimed.

The embodiments of the invention in which an exclusive property or privilege is claimed are defined as follows:

1. A centering device for logs for veneer processing, comprising supporting means for supporting a log in said centering device, sensing means for sensing the surface contour of said log at a plurality of locations along its length and also between its ends, said log having first and second end surfaces and a stem portion therebetween, and computer means for processing the observations of said sensing means to compute the proper end centers of said log under examination for the maximum dimension of the cylinder which can be obtained from said log in veneering operations.

2. The construction according to claim 1, and wherein said log supporting means comprises a plurality of end supports for engaging first and second end portions of said log, said end supports comprising V-shaped cooperating surfaces for bearing against said end portions of said log, whereby said log end portions are supported thereabove.

3. The construction according to claim 1, and wherein said supporting means comprises a plurality of end supports, each formed with cooperating upwardly divergent log engaging surfaces, whereby said log end portions are supported above the center point of commencement of upward divergence of said log engaging surfaces.

4. The construction according to claim 1, and wherein said supporting means comprises a plurality of end supports, each formed with cooperating V-shaped log engaging surfaces upwardly divergent from a center point, whereby said log end portions are supported above said center point of divergence of said V-shaped log engaging surfaces.

5. The construction according to claim 1, and wherein said supporting means comprises a plurality of end supports, each formed with cooperating substantially plane upwardly divergent log engaging surfaces, whereby said log end portions are supported above the center point of upward divergence of said log engaging surfaces.

6. The construction according to claim 1, and wherein said supporting means comprises a plurality of end supports, each formed with cooperating upwardly divergent log engaging surfaces which surfaces are substantially non-planar and inherently curved for optimum engagement with said log contour surfaces, whereby said log end portions are supported above the center point of upward divergence of said log engaging surfaces.

7. The construction according to claim 1, and wherein said supporting means comprises mutually spaced first and second log support column structure means, means for supporting said structure means on a floor surface, said log having first and second end portions adjacent said first and second end portion surfaces thereof, said log support column structure means comprising a plurality of log end supports for engaging said first and second end portions of said log, said end supports comprising first and second support arm members with upwardly divergent cooperating log engaging surfaces for bearing against said respective end portions of said log, whereby said log end portions are supported above the center point of divergence of said log engaging support arm members, and log moving means carried by said log support column structure means and engaging said log end supports and constructed and arranged for adjustably movably positioning said log during its engagement with said log end portions.

8. The construction according to claim 7, and wherein said log moving means comprises log end portion elevating and lowering means for elevating and lowering said respective end portions of said log.

9. The construction according to claim 1, and wherein said supporting means comprises mutually spaced first and second log support column structure means, log support column structure base means for supporting said structure means on a floor surface, said log having first and second end portions adjacent said first and second end portion surfaces thereof, said log support column structure means comprising a plurality of log end supports for engaging said first and second end portions of said log, said end supports comprising first and second arm members with upwardly divergent cooperating log engaging surfaces to form a V-shaped hollow area for bearing against said respective end portions of said log, whereby said log end portions are supported above the center point of divergence of said log engaging support members, and log moving means carried by said log support column structure means and engaging said log end supports and constructed and arranged for adjustably movably positioning said log during its engagement with said log end portions.

10. The construction according to claim 9, and wherein said log moving means comprises log end portion elevating and lowering means for elevating and lowering said respective end portions of said log independently of each other.

11. The construction of claim 1 and wherein said sensing means comprises first and second sensing means for sensing the surface contour at first and second ends of said log, and a further plurality of sensing means at locations intermediate said first and second sensing means for sensing surface contours of said log intermediate said first and second sensing means.

* * * * *